3,830,894
PROCESS FOR THE PREPARATION OF FILLED PHENOL RESIN FOAM MATERIALS

Hans Juenger, Emil-Muller-Strasse 21, Troisdorf, and Franz Weissenfels, 17 Grafenkreuz, Siegburg, Germany
No Drawing. Continuation-in-part of application Ser. No. 753,754, Aug. 19, 1968, which is a continuation-in-part of application Ser. No. 428,868, Jan. 1, 1965, both now abandoned. This application Sept. 16, 1971, Ser. No. 181,238
Int. Cl. B29d 27/00
U.S. Cl. 264—41               27 Claims

ABSTRACT OF THE DISCLOSURE

This present disclosure concerns filled phenol resin foam materials, as well as a process for the preparation of filled phenol resin foam materials containing a skeleton-like mass of particulate filler material suitable as a homogeneous construction materials wherein the interspaces between the filler are filled with the phenolic resin foam.

CROSS-REFERENCES TO RELATED APPLICATIONS

The present application is a continuation-in-part application of copending application, Ser. No. 753,754, filed Aug. 19, 1968, which application is a continuation-in-part application of application, Ser. No. 428,868, filed Jan. 28, 1965, both of which are now abandoned.

BACKGROUND OF THE INVENTION

This invention relates to the preparation of filled phenol resin foam materials and to a process for the preparation of filled phenol resin foam materials wherein the interspaces of a filler skeleton made up of regularly or irregularly-shaped filler materials are completely or partially filled with foamable phenol resin foam materials. Even more particularly, the present invention relates to a process for the preparation of filled phenol resin foam materials and the articles produced therefrom wherein certain filler materials are mixed with foamable or already partially-foamed, unhardened phenol resin foamable materials and the phenol resins are foamed and hardened in situ.

It is known that the properties of masses of synthetic resins are decisively influenced by the addition of inert substances. Characteristic examples thereof are the duroplastic molded masses or articles which are made by employing various filler materials. However, the fillers customarily used in this case, such as, for example, wood powder, rock powder, asbestos powder, short-fibered cellulose, etc., are found to be of little utility when employed together with the phenol resin foams described hereinbelow, both with respect to the processing of the mixture (thickening) and with respect to the properties of the resultant foam material.

SUMMARY OF THE INVENTION

Accordingly, it is an object of the present invention to provide a process for the preparation of uniformly-filled phenol resin foam materials.

Another object of the present invention is to provide a process for the preparation of phenol resin foam materials containing a filler skeleton or body, which form articles having properties superior to articles made from pure phenol resin foam materials.

A further object of the present invention is to provide a process for the preparation of filled phenol resin foam materials which contains regularly or irregularly-shaped substances, which process may be conducted in a considerably improved manner and hence overcomes the disadvantages and deficiencies of prior art methods.

These and other objects of the present invention will become apparent to those skilled in the art from a reading of the following specification and claims.

In accordance with the present invention, it has been found that regularly or irregularly-shaped substances, especially particulate filler materials, which are of relatively large volume and which, in bulk, provide hollow interspaces between the individual particles accessible for the foamable resinous mixtures that will be described in further detail hereinafter, or loosely-packed, shaped articles made from such substances, may be processed in a considerably improved manner with the use of liquid foamable phenolic resin mixtures or lightly-foamed but not yet hardened liquid phenol foam resinous mixtures and that technically valuable changes in properties, as compared to pure phenol resin foam materials, can be obtained thereby.

When granulated fillers are employed, those particles with a minimum dimension of approximately 1 mm. and with a maximum dimension of 50 mm. are particularly suitable for use in the process of the present invention, though a preferable range would be about 5 to about 30 mm. It will be appreciated that these dimensions represent the grain size of the particles. If fibers, chips and/or shavings are used, these should have a minimum length of approximately 5 mm. and a maximum length of 600 mm. or larger.

The following filler materials may be employed: inorganic lightweight materials, such as, for example, vermiculite and inflating clay, inorganic staple fibers of, for instance, asbestos or glass, wood shavings or wood fibers (excelsior), chippings or shavings from plastic foam materials, and cuttings from natural or synthetic fabrics. Also, other inorganic materials such as exfoliated clay, mica, pumice, slate and perlite may be used in some applications. Depending upon the type and quantity of the substance used as filler, improvements in the mechanical resistance, such as the compression strength, the resistance to bending, the tensile, impact and shearing strength, the resistance to abrasion, and the resistance to fire, etc., may be attained.

In regard to the filler particle size discussed above, it is to be noted that the process of the present invention contemplates a selective filling, with foamable phenol resin, of the interspaces between the individual particles. Thus, the particle sizes must be such as to define therebetween interspaces with at least minimal volumetric capacity. Accordingly, filler materials in particulate form wherein the particles are so small as to be powders, would not be within the contemplation of the process of the present invention.

The liquid foamable resin mixtures which may be utilized for the production of filled phenol resin foam materials in accordance with the method of the present invention are produced, for example, from solutions of alkaline condensed resols having a pH value of greater than 4 which, for the purpose of achieving a uniform cellular structure, contain a surface-active substance preferably in an amount of from 1–5% by weight. It should be understood that the term "phenol resin," as contemplated by the present invention, designates resins produced by the reaction of a phenolic compound with an aldehyde, for example, phenol-formaldehyde resins including the resols or one-step phenolic resins and novolaks. The novolaks are hardened, i.e., crosslinked, by use of an aldehyde precursor such as hexamethylenetetramine; whereas the resols or one-step phenolic resins, which are preferred for purposes of this invention, may be hardened by heat alone, or by an acid. Often the resols are hardened by acidic mixture of sulfuric acid, para-toluene sulfonic acid and water. Liquid or solid blowing agents and a generally acid-containing hardener are added to these resins in producing the liquid foamable phenol resin mixtures. The hardener to be used is chosen so as to be compatible with the respectively-employed filler material. The foaming-up process takes place as a result of the transition of the solid or liquid blowing agent into a gaseous condition often by the application of heat. The hardening process is regulated in such a manner that, as soon as the desired foam volume has been reached, the structure of the foam material is solidified to such an extent that any possible collapse thereof is effectively prevented. The foaming and hardening processes utilized herein are known per se and are those conventional in the art of producing phenolic foams. Also, it will be appreciated the resins are used in the liquid form, e.g. a resin solution containing organic solvents such as alcohol, in many instances.

As briefly referred to above, the process according to the present invention may include, as a preliminary step, the formation of a loosely-packed, shaped article of filler material particles, with interspaces between the individual particles to accommodate the foamable phenol resin. The low-density preform of filler material, i.e. filler skeleton, may be formed by applying a bonding agent to the filler material particles and/or may be accomplished by the application of limited pressure.

The method according to the present invention further contemplates wetting or coating of the filler material particles with a layer of film of the foamable phenol resin mass. This step can be practically accomplished by mixing the filler material particles with the foamable mass, then removing the particles from the mass, for example, by means of a sieve, whereby the excess portion of the foamable mass can run off. Preferably, the desired quantitative ratio of the particles to be enveloped to the foamable synthetic resin mass should be predetermined prior to the wetting process, such that all particles will be wetted to the desired extent with no excess of foamable mass to be removed. In other words, the filler particles in the body of wet filler material are unaffected by its relative position in the mold and the particles remain uniformly distributed within the mold without separating from the resin. The preliminary determination of this ratio is desirable since it has been found that, while the excess mass of foamable synthetic resin may be removed, for example, by means if a sieve, the mass thus removed may be unsuitable for further use as settng may occur during the wetting and removal of the excess. Under such circumstances, the thickness of the film or layer remaining on the filler material particles depends primarily upon the viscosity of the foamable mass. The individual filler material particles, thus wetted, may then be introduced into a mold, perhaps accompanied by a vibratory motion thereof, to accomplish an extremely uniform distribution of the particles within the mold. The uniformity of distribution, it should be noted, is enhanced in that no excess foamable mass is present, which excess could conceivably cause separation between the filler material particles due to differences in density between filler material and foamable mass, i.e. the filler skeleton or body is unchanged by gravity. In general, the amount of filler particles constitutes from about 60 to 80% by weight and the foamable phenolic resin mixture, i.e. the resin, the hardeners, and the blowing agent constitutes from 20 to 40% by weight of the final product.

Also, the filler skeleton formed in ether procedure is formed with mutually contacting particles and this mutual contact is maintained during the foaming procedure by (1) use of a binder, or (2) by placing the filler skeleton under pressure, e.g. by the weight of the mold lid so that the particles of filler material will not be pressed apart by the foamy pressure.

Having accomplished a uniform distribution of filler material particles arranged loosely within a constraining form such as a mold, the process may then continue with the foaming and hardening of the foamable phenolic resin within the interspaces between the individual particles. Herein it should be noted that the spacing between the individual particles of the filler material, and hence the dimensions of the interspaces therebetween, may be controlled by adjusting the viscosity and thus the coating thickness of the foamable mass utilized in wetting the filler material particles, which determines the spacing between said particles.

It will be understood that in accordance with this invention at least a major proportion of the interspaces or cavities between the filler material will be filled with the foamable phenolic resin prior to the foaming operation, i.e. about 80% or more. In the procedure noted above wherein the filler material is initially wetted or coated with a layer of the foamable phenolic resin, essentially all of the interspaces are filled. For this reason and because of its simplicity, this procedure is preferred.

The entire foaming process as described may be carried out with the resins customarily used in the preparation of phenol resin foams. This process may be carried out within a temperature range of from 0–100° C., and preferably at 15–60° C., both in open and in closed molds.

DESCRIPTION OF THE PREFERRED EMBODIMENTS

The following examples are given merely as illustrative of the present invention and are not to be construed as limiting.

EXAMPLE 1

1600 grams of a foamable phenol resin is intimately mixed with 96 ml. of n-pentane as blowing agent. Added to this mixture is 160 ml. of a 70% solution of alcoholic sulfuric acid as hardener. Wetted with this mixture while stirring in 5350 grams of inflating clay (having a particle diameter of 10–20 mm.). These proportions represent the predetermined ratio of foamable mass to particles such that the particles are wetted to the desired extent leaving no excess of foamable mass to be removed, for the reasons set forth on page 5, above. After the completion of the mixing process, the mixture is poured, while shaking, into a rectangular mold which is open at the top (20 x 30 x 35 cm.). The mold is thereupon tightly closed with a lid. The foaming and hardening processes take place during a two-hour storage of the mold at 40° C.

After this amount of time, an article is formed which corresponds to the mold, the resistance of which to pressure (compression strength) has been increased by 220–250% by the addition of the inflating clay as compared to the article formed without the use of said clay. When exposed to the flame of a Bunsen burner, the sheet of foam material made by employing the inflating clay, as described above, is found to be considerably more resistant to the action of the open flame than a corresponding sheet from pure phenol resin foam.

EXAMPLE 2

2000 grams of a foamable phenol resin, commercially available under the designation of T 612 S, is intimately mixed initially with 80 grams of very finely pulverized calcium carbonate and with 100 ml. of n-pentane as well as, subsequently, with 400 ml. of a 20% solution of alcoholic hydrochloric acid. Immediately after the addition of the hardener, the mixture foams lightly due to the partial reaction of the hydrochloric acid with the calcium carbonate. 1330 grams of commercially available wood shavings is then wetted with this foam by stirring therewith. As in Example 1, above, these proportions are predetermined to represent the desired quantitative ratio of foamable mass to particles to be wetted. The mixture thus obtained is introduced into a mold having a content of 25 liters. The mold is then tightly closed with a lid. The foaming-up and hardening take place under the action of heat (2 hours at 40° C.) while the n-pentane evaporates.

As a result of the addition of the wood shavings, the foamed material obtained displays a resistance to bending that is approximately 80% higher, a tensile strength that is approximately 50% higher, and an impact strength that is approximately 120% higher compared to an unfilled phenol resin foam material.

EXAMPLE 3

A shaped article, for example, a light-weight wood fiber construction sheet, is made from wood fiber or excelsior (having a chip width of from 3–6 mm. and a chip length of from 300–600 mm.) by employing a binding agent of synthetic resin. The synthetic resin binder brings about a union or blending of the individual excelsior fibers at the mutual points of tangency thereof. 241 grams of a foamable mixture consisting of 200 grams of phenol resin, commercially available under the designation of T 612 S, 14 ml. of monofluorotrichloromethane as blowing agent and 18 ml. of a 20% solution of alcoholic hydrochloric acid as hardener are poured into a flat, upwardly open box mold having a base of 50 x 25 cm. The layer height of the mixture in the horizontally positioned mold is about 2 mm. Immediately after pouring, an article of the kind described above having the dimensions 48 x 23 x 3 cm. is placed into the mixture and secured into position by applying a lid. The mold together with the contents thereof is placed into a warming cabinet for 60 minutes at approximately 35° C. During this time, the foam penetrates into the hollow interspaces which are accessible to it and is hardened.

A sheet made in this manner has a thermal conductivity of $\lambda=0.04$ Kcal./mh.° C. at 20° C. A corresponding lightweight construction sheet made from wood fiber (having a volumetric weight of about 430 kg./m.$^3$) without a foam material filling of its hollow spaces displays, during an experiment at 20° C., a thermal conductivity of $\lambda=0.07$ Kcal./mh.° C.

EXAMPLE 4

28 kilograms of coarse exfoliated clay, having a mesh size of 10–15 millimeters, 2.8 kilograms of phenol resin binding agent (commercial designation P 1600) and 0.56 liter of hardener fluid consisting of sulfuric acid, p-toluol sulfo acid and water are intermixed in a mixer. An open box-shaped mold having a surface area of 100 by 100 centimeters and a height of 12 centimeters is then completely filled with this mixture. The mixture is hardened to a loosely shaped body within 3 hours at room temperature. The following phenol resin mixture which is adapted to foam at room temperature, is poured on said loosely shaped body in a uniform distribution:

3.6 kilograms phenol foam resin (commercial designation T 612 S)

0.45 liter monofluorotrichloromethane (commercial designation Frigen S 11)

0.45 liter of a hardener fluid consisting of sulfuric acid, p-toluol sulfo acid and water (commercial designation STW hardener)

Following the pouring operation, the mold is closed with a lid weighing three tons. The foamy synthetic resin which is produced penetrates into the cavities of the loosely shaped body and completely hardens with a period of about two hours. The finished structure is then removed from the mold. It displays a compression strength of approximately 65 kilograms/cm.$^2$.

Chemically, the phenol resin designated as T 612 S in Examples 2 and 3 is the reaction product of phenol with formaldehyde. Other phenol resins operative for the purposes of the present invention include condensation products of phenol and/or phenol derivatives such as cresols and xylenols with aldehydes, preferably formaldehyde.

It will be appreciated that the phenolic resol resins suitable for the preparation of the phenolic resin foams are obtained, for example, by the condensation of one mole of a phenol with 1 to 3 moles of aldehydes in an alkaline medium, then removing the water by vacuum distillation, and, in some cases, adjusting the pH to values greater than 4. The aldehydes reacting with the phenols include formaldehyde, compounds that decompose to formaldehyde such as paraformaldehyde or trioxane, acetaldehyde, furfurol and hexamethylenetetramine, etc., and mixtures of these compounds.

The condensation is performed in an aqueous alkaline medium.

The compounds used as blowing agents include both solid compounds from which inert gases, preferably carbon dioxide, are liberated by heat, and low-boiling organic solvents. The solid blowing agents are to yield the gases with as little residue as possible, examples being ammonium carbonate or ammonium bicarbonate, or are to leave a residue that is odorless and does not attack the foam, examples being the alkali carbonates and bicarbonates. Furthermore, both inorganic and organic peroxides can be used, such as some of the azo compounds like $\alpha,\alpha$-azodiisobutyric acid nitrile.

Liquid blowing agents include low-boiling organic solvents such as chloroform, carbon tetrachloride, chlorofluoromethane, n-pentane, n-butyl ether, petroleum ether, and ethylene dichloride.

The solid blowing agents are used in quantities of 0.3 to 10% of the weight of the phenolic resol resin. The liquid blowing agents are added in quantities of between 1.0 and 20.0% of the weight of the phenolic resol resin.

The hardeners can be acids in either liquid or powder form. The required amount depends to some extent on the blowing agent that is used; if the blowing agent consists of a solid salt that develops gases, a portion of the acid is used to liberate the gases. When low-boiling solvents are used as the blowing agents hardener content is correspondingly lower. Suitable water-soluble acids are not only mineral acids (HCl, $H_2SO_4$) but also sulfonic acids which have an especially good solubility in water and in which the sulfonic acid group is linked directly with an aromatic ring, which can be substituted if desired. Examples are benzene-sulfonic acid, p-toluenesulfonic acid, chlorobenzene-3,5-disulfonic acid, bromobenzene-4-sulfonic acids, the o-, m- and p-cresolsulfonic acids, or aniline-2,5-disulfonic acid. The sulfonic acid group can also be linked with a polynuclear aromatic radical, as in the case, for example, of the naphthalenesulfonic acids or the naphthylaminesulfonic acids. Alipheatic sulfonic acids, however, can also be used as hardeners, examples being butylsulfonic acids, propylsulfonic acid or hexysulfonic acid.

The aqueous solution of these acids usually contains 30 to 50% of the acid by weight. Some of the acids, such as p-toluenesulfonic acid, for example, can also be used in powdered form as the hardener. In either case, the amount of 100% acid hardener is between 1.0 and 15.0% of the weight of the phenolic resol resin.

The surface-active agents are used in quantities of 0.4 to 10%, and preferably 1 to 5%, of the weight of the phenolic resol resin. Suitable surface-active agents are, for example: polyethylene ethers of a long-chained monofatty acid ester of sorbitol, such as the polyethylene ether of monolauric-sorbitol ester and the polyethylene ether of monooleic-sorbitol ester, and water-soluble ethoxylated castor oil.

It will be also understood that the mutually contacting particles of filler material are each arranged in the filler material or body in contact with at least one other particle and are of such size to insure interspaces therebetween. This arrangement insures that the resulting foam product has predominantly closed cells and has the required compression resistance.

While the novel principles of the invention have been described, it will be understood that various omissions, modifications and changes in these principles may be made by one skilled in the art without departing from the spirit and scope of the invention, and all such modifications and changes are intended to be included within the scope of the following claims:

What is claimed is:

1. A process for the production of a phenolic resin foam product filled with large-volume filler materials having a particle size of from about 1 to 600 mm. comprising wetting the surfaces of said filler materials with a liquid foamable phenolic resin mixture consisting essentially of a phenolic resin, a liquid or solid blowing agent, a curing agent and about 0.4 to 10% of a surfactant, based on the weight of the phenolic resin, said liquid foamable phenolic resin mixture being added to said filler materials in such proportions that said filler materials do not separate by gravity from said resin mixture, said wetting forming said particles and said mixture into an integral liquid mass which can be poured into a mold, pouring the wetted filler material into a mold so that said filler materials form a filler skeleton therein with each filler particle contacting at least one other filler particle, said filler particles forming therebetween interstices containing said foamable phenolic resin mixture, and foaming and curing said mixture without additional external pressure upon said mold in order to produce a predominantly closed cell foam product.

2. The process of claim 1, wherein said foaming is carried out within the mold by application of heat.

3. A filled phenol resin foam shaped article produced by the process of claim 1.

4. The process of claim 1, wherein the filler materials are inorganic and have a particle size of about 1 mm. to 50 mm. and are selected from the group consisting of vermiculite, inflating clay, exfoliated slate, exfoliated clay, exfoliated mica, exfoliated pumice, and exfoliated perlite.

5. The process of claim 1, wherein the filler materials have a particle size of about 5 mm. to 600 mm. and are selected from the group consisting of asbestos fibers, glass fibers, wood shavings, wood fibers, shavings from synthetic foam materials, and cuttings from natural or synthetic fibers.

6. The process of claim 1, wherein the phenol resin is an alkaline catalyzed phenol aldehyde resol.

7. The process of claim 1, wherein the depositing of said particles within a mold is accompanied by imparting a vibratory motion to the mold.

8. The process of claim 1, wherein the particles of filler material are coated with a partially foamed phenol aldehyde resin mixture and the foaming is completed within the mold.

9. The process of claim 1, wherein filler material comprises from about 60 to 80% by weight and the phenolic resin mixture comprises from about 20 to 40% by weight of the resultant foam product.

10. The process according to claim 1, wherein said surfactant is present in said liquid foamable phenolic resin in an amount of about 1 to 5% based on the quantity of the phenolic resin.

11. The process according to claim 1, wherein said foaming and curing is accomplished in a closed mold so that mutual contact of the filler particles in said filler skeleton is maintained during foaming and curing.

12. The process according to claim 10, wherein said foaming and curing is accomplished at a temperature from about 0 to 100° C.

13. The process according to claim 12, wherein said foaming and curing is accomplished at a temperature of about 15 to 60° C.

14. The process according to claim 1, wherein said fillers are granulated and have a minimum dimension of approximately 1 mm. and a maximum dimension of approximately 50 mm.

15. The process according to claim 14, wherein said filler materials have a minimum dimension of about 5 mm. and a maximum dimension of about 30 mm.

16. The process according to claim 1, wherein said filler material is selected from the group consisting of fibers, chips, shavings and mixtures thereof having a minimum length of approximately 5 mm. and a maximum length of about 600 mm.

17. The process according to claim 1, wherein said foaming and curing are accomplished in an open mold.

18. The process according to claim 1, wherein said phenolic resin is the reaction product of a phenolic compound and an aldehyde.

19. The process according to claim 18, wherein said phenolic resin is a phenol-formaldehyde resin.

20. The process according to claim 19, wherein said phenolic resin is selected from the group consisting of resols and novolaks.

21. The process according to claim 1, wherein said phenolic resin is a condensation product of a member selected from the group consisting of phenols, cresols and xylenols with an aldehyde.

22. The process according to claim 1, wherein said liquid foamable phenolic resin mixture includes about 1 to 20% of a liquid blowing agent selected from the group consisting of chloroform, carbon tetrachloride, chlorofluoromethane, n-pentane, n-butyl ether, petroleum ether and ethylene dichloride.

23. The process of claim 1, wherein said liquid foamable phenolic resin mixture includes about 0.3 to 10% of a solid blowing agent selected from the group consisting of ammonium carbonate, ammonium bicarbonate, alkali metal carbonates, alkali bicarbonates, and organic peroxides.

24. The process of claim 1, wherein said liquid foamable phenolic resin mixture contains from about 1 to 15% by weight based on the weight of the phenolic resin of said curing agent.

25. The process according to claim 1, wherein said surface-active agent is selected from the group consisting of polyethylene ethers of long-chained monofatty acid esters of sorbitol and water-soluble ethoxylated castor oil.

26. The process according to claim 25, wherein said surface-active agent is selected from the group consisting of polyethylene ether of monolauricsorbitol ester and polyethylene ether of monooleic-sorbitol ester.

27. A process for the production of phenolic resin foamed products filled with a large volume filler material comprising mixing (A) about 60 to 80% by weight of a filler material comprising either
  (i) inorganic particulate material having a size of about 1 mm. to 50 mm. and selected from the group consisting of vermiculite, inflating clay, exfoliated clay, mica, pumice, slate and perlite, or
  (ii) substances having a size of about 5 to 600 mm. and selected from the group consisting of asbestos fibers, glass fibers, wood shavings, wood fibers, shavings from synthetic foam material, and cuttings from natural or synthetic fibers, and (B) about 20 to 40% by weight of a liquid foamable phenolic resin mixture capable of forming a phenolic resin foam and consisting essentially of a phenolic resin, and in addition based on the weight of said phenolic resin about 0.3 to 20% of a blowing agent, about 1 to 15% of a curing agent for said phenolic resin and about 0.4 to 10% of a surfactant, said liquid foamable phenolic resin mixture having a viscosity such that said filler materials do not separate by gravity from said liquid foamable phenolic resin mixture, pouring the wetted filler material into a closed top mold so that said filler materials form a filler skeleton therein with each filler particle contacting at least one other filler particle, said filler particles forming therebetween interstices containing said foamable phenolic resin mixture, and foaming and curing said mixture in said closed top mold so that mutual contact of adjacent filler particles is maintained in order to produce a predominantly closed cell foam product having a homogeneous distribution of filler particles therein.

References Cited

UNITED STATES PATENTS

| | | | |
|---|---|---|---|
| 3,484,391 | 12/1969 | Wheatley et al. | 260—2.5 F |
| 3,207,652 | 9/1965 | Shannon | 260—2.5 F |
| 2,828,271 | 3/1958 | Armstrong et al. | 260—2.5 F |
| 3,567,807 | 3/1971 | Shannon | 264—45 |
| 3,206,201 | 9/1965 | Hendricks | 260—2.5 F |
| 3,267,048 | 8/1966 | Horste et al. | 260—2.5 F |
| 3,023,136 | 2/1962 | Himmelheber et al. | 260—2.5 F |
| 2,975,488 | 3/1961 | Brauner | 264—DIG 017 |

FOREIGN PATENTS

| | | | |
|---|---|---|---|
| 1,090,741 | 11/1967 | Great Britain | 260—2.5 F |

MELVYN I. MARQUIS, Primary Examiner

U.S. Cl. X.R.

260—2.5 F; 264—41, 45, DIG 006, DIG 017